Dec. 24, 1929.　　A. M. FARMER　　1,740,812
PISTON RING
Filed July 27, 1923
Fig.1.
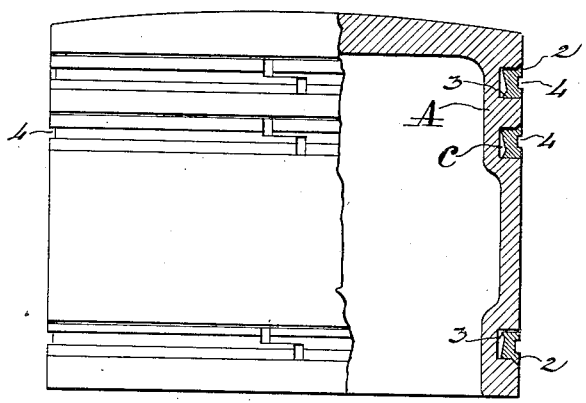
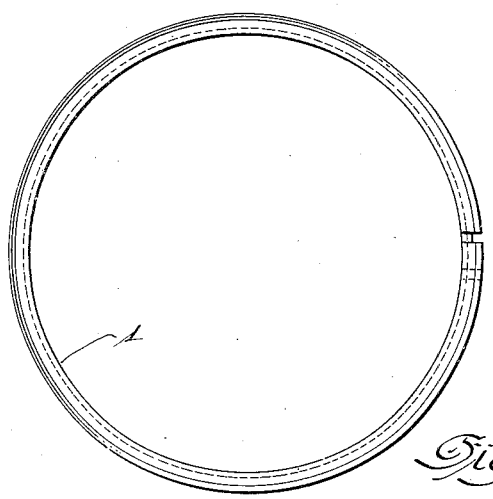
Fig.2.
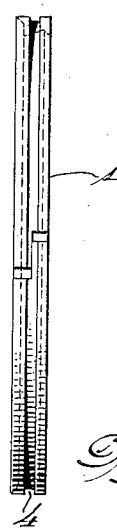
Fig.3.
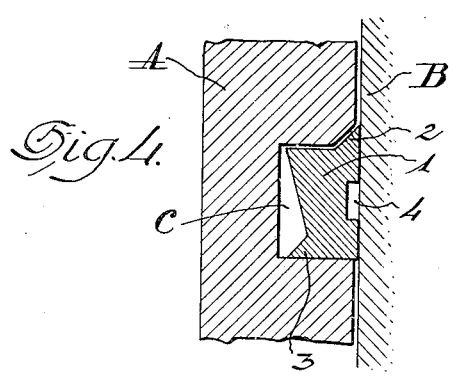
Fig.4.
Inventor:
Albert M. Farmer
By Bartlet & Bartlet
Attorneys.

Patented Dec. 24, 1929

1,740,812

UNITED STATES PATENT OFFICE

ALBERT M. FARMER, OF CHICAGO, ILLINOIS

PISTON RING

Application filed July 27, 1923. Serial No. 654,191.

This invention relates to a packing ring for pistons, and more particularly to pistons of internal combustion engines.

Packing rings of this type as usually constructed are split expansion rings mounted within grooves in the piston and in the common form of such rings, the natural tendency of the ring itself to expand is depended upon to keep the ring in close contact with the cylinder wall and prevent leakage past the piston. In order to insure against leakage, these rings when first inserted have a greater expansion force than is necessary to keep them tight, and as they wear they gradually become loose, or the force which holds them against the cylinder wall becomes less and allows leakage. In other types of rings common upon the market, a spring is placed inside the ring within the groove to exert an outward force on the ring and hold it in firm contact with the cylinder wall, but in all constructions where expansion of the ring is caused by a force inherent within the ring itself, or by separate mechanical means employed in connection with the ring, the expansive force is too great at times and in use soon becomes insufficient.

The object of the present invention is to so construct the ring itself, that it will be expanded at all times firmly against the cylinder wall by the force of compression of fluid within the cylinder, and further, to so construct the ring that it will not only be expanded outwardly against the cylinder wall, but will also be held in firm contact with one side of the groove in which it is placed to prevent leakage not only between the ring and the cylinder wall, but also past the ring through the groove. These objects are attained through the configuration of the ring itself and without the employement of undue inherent expansion in the ring or separate means employed in connection with the ring, the necessary force for holding the ring expanded and against a wall of its groove, being provided by the internal pressure within the cylinder caused by compression of fluid therein, and therefore the force with which the ring is held against these contact surfaces is always in direct proportion to the force of compression within the cylinder and is not dependent upon the expansive force of the ring itself or expanding ring elements employed in connection therewith. The ring is therefore held at all times in close contact with the cylinder wall and groove side, greatly increasing the life of the ring and causing it to form a tight joint at the time that such joint is most required.

It is also an object of the present invention to provide certain other new and useful features in the construction, all as hereinafter more fully set forth.

With the above and other ends in view, the invention consists in the matters hereinafter set forth and more particularly pointed out in the appended claim, reference being had to the accompanying drawing, in which Figure 1 is a side elevation of a piston with parts broken away and in section, and showing a plurality of packing rings embodying the invention, in place within grooves in the wall of the piston;

Fig. 2 is a plan view of one of the rings detached;

Fig. 3 is an edge elevation of the ring shown in Fig. 2, and

Fig. 4 is an enlarged sectional detail of a portion of the piston wall and adjacent cylinder wall, with a ring shown in section within a groove in the piston wall.

In order to secure a ring having the necessary inherent expansive tendency, it is the usual practice to form such rings with an inner wall which is eccentric to the outer wall of the ring, that is, the center of its inner circle is offset relative to the center of its outer circle, but in the present invention, as the inherent expansion of the ring is not depended upon to hold it in firm contact with the cylinder wall, the present ring may be formed with concentric surfaces and by splitting the ring in the usual manner, forming the usual step joint, the ring is free to expand against the cylinder wall.

In order that the force of fluid compression within the cylinder may be employed to expand the ring, the ring which is indicated as a whole by the numeral 1, is formed at one side with an outstanding annular rib or flange 2, the outer surface of such flange being in the plane of the outer surface of the ring which contacts with the wall of the cylinder. The groove C in the wall A of the piston is formed of a size so that the ring 1 will fit therein and slide freely to expand into firm contact with the wall of the cylinder. To provide a space in the piston wall adjacent the groove C for the annular rib 2, the piston wall is cut away at one side of the groove to conform approximately to the inner side of the annular rib 2, which inner side surface is preferably formed at an angle of approximately 45° to the outer contact surface of the ring.

The rings which are placed in the grooves adjacent the upper end of the piston are placed with their annular ribs 2 extending upwardly or toward the upper end of the piston, and the ring or rings adjacent the lower end of the piston are preferably placed with the annular rib or flange extending downwardly or toward the lower end of the piston. Therefore upon the up-stroke of the piston and the compression of fluid within the cylinder, this compressive force passing downward between the piston and cylinder wall comes against the inner side of the upstanding annular rib or flange 2, and thus exerts a force thereon to expand the ring into firm contact with the wall of the cylinder. As this inner surface of the rib is inclined inwardly and downwardly, the force thereon of the compressed fluid will tend not only to expand the ring, but also to force it into firm frictional contact with the lower side of the groove in which the ring is mounted. This forcing and holding of the ring against the bottom wall of the groove prevents compression from passing by the ring through the groove, and such escape of compression is further guarded against by providing a second annular flange or rib 3 at the inner side of the ring adjacent the bottom of the groove, with the lower side surface of this rib in the plane of the lower side surface of the ring and with the upper side surface of the rib or flange inclined upwardly and outwardly and meeting the lower surface at an angle of substantially 45°. The force of compressed fluid passing into the groove behind the ring therefore comes upon the upper side of this flange 3, exerting a force thereon which further assists in holding the ring firmly down upon the bottom of its groove and also forcing the ring outwardly or expanding it in its groove.

If found desirable, an annular groove 4 may be formed in the outer contact surface of the ring, forming an oil groove to carry oil for the purpose of lubricating the surface of the cylinder.

Obviously, the configuration of the ring may be varied to suit the conditions of use, and the particular form, arrangement and number of annular ribs or flanges may also be varied to suit the conditions under which the ring is operated in connection with the various sizes and types of pistons. It is also obvious that other changes in the form and construction of the ring which fall within the scope of the appended claim are contemplated, and I therefore do not limit myself to the construction shown.

What I claim is:—

A piston ring having a rib at the inner base edge thereof, said rib having a surface co-planar with the base and another surface sloped from the base plane upwardly and outwardly of the ring, thereby forming a knife edge adapted to engage the base of a piston ring groove, said ring also having another rib at the upper outer edge thereof, said latter rib having a surface co-planar with the outer wall of the ring and another surface sloped from the last named surface downwardly and inwardly to the top of the ring, thereby forming a knife edge adapted to engage a cylinder wall.

In testimony whereof I affix my signature.

ALBERT M. FARMER.